United States Patent [19]

Brantley

[11] 4,453,890
[45] Jun. 12, 1984

[54] BLADING SYSTEM FOR A GAS TURBINE ENGINE

[75] Inventor: James W. Brantley, Fairfield, Ohio

[73] Assignee: General Electric Company, Cincinnati, Ohio

[21] Appl. No.: 274,927

[22] Filed: Jun. 18, 1981

[51] Int. Cl.[3] .................. B63H 1/20; B64C 11/04
[52] U.S. Cl. ............................. 416/220 R; 416/221
[58] Field of Search .................. 416/220, 220 R, 221

[56] References Cited

U.S. PATENT DOCUMENTS

| | | | |
|---|---|---|---|
| 3,055,633 | 9/1962 | Pouit | 253/77 |
| 3,458,119 | 7/1969 | Shaw | 416/220 |
| 3,572,970 | 3/1971 | Smuland | 416/221 |
| 3,734,646 | 5/1973 | Perkins | 416/220 |
| 4,006,999 | 2/1977 | Brantley et al. | 416/224 |
| 4,221,542 | 9/1980 | Acres et al. | 416/220 R |
| 4,265,595 | 5/1981 | Bucy, Jr. et al. | 416/220 R |

FOREIGN PATENT DOCUMENTS

| | | | |
|---|---|---|---|
| 2345605 | 10/1977 | France | 416/220 R |

OTHER PUBLICATIONS

General Electric Company Program Review to Air France, KLM, Lufthansa Air Lines on Jul. 9, 1980, p. D10325-051380.

Primary Examiner—Philip R. Coe
Assistant Examiner—Shewen Bian
Attorney, Agent, or Firm—Stephen S. Strunck; Derek P. Lawrence

[57] ABSTRACT

In one embodiment, a fan blade includes an airfoil portion, a platform portion, a shank portion, and a generally axial dovetail portion of a predetermined axial dimension for matingly engaging a generally axial dovetail receiving slot of substantially the same predetermined axial dimension in a fan disk member. Aft cleat means, including a portion having substantially the same cross section as the dovetail portion, is provided and is integral with the dovetail portion and projects generally axially therefrom. The aft cleat means strengthens the dovetail portion. Methods are provided for fabricating such a blade and for strengthening existing blades. Other embodiments are disclosed.

8 Claims, 8 Drawing Figures

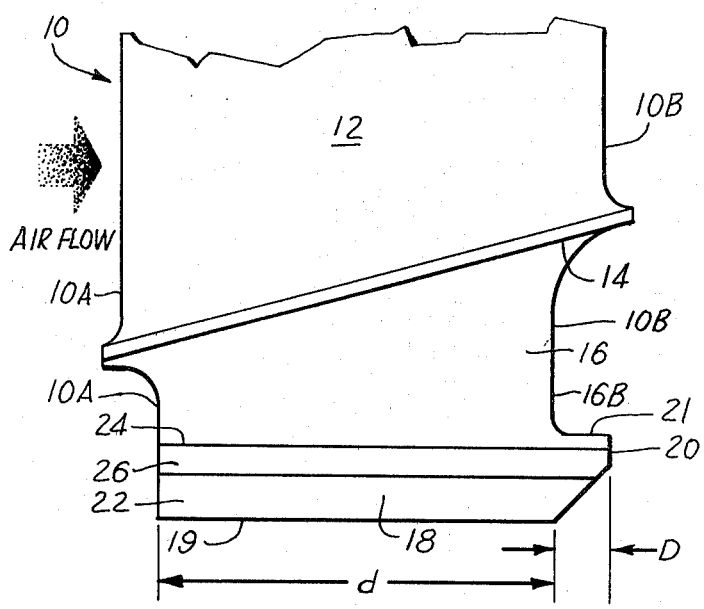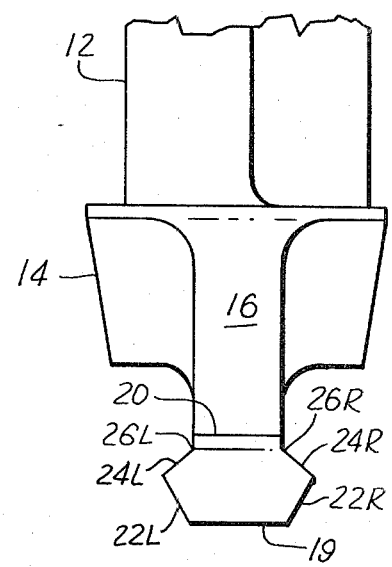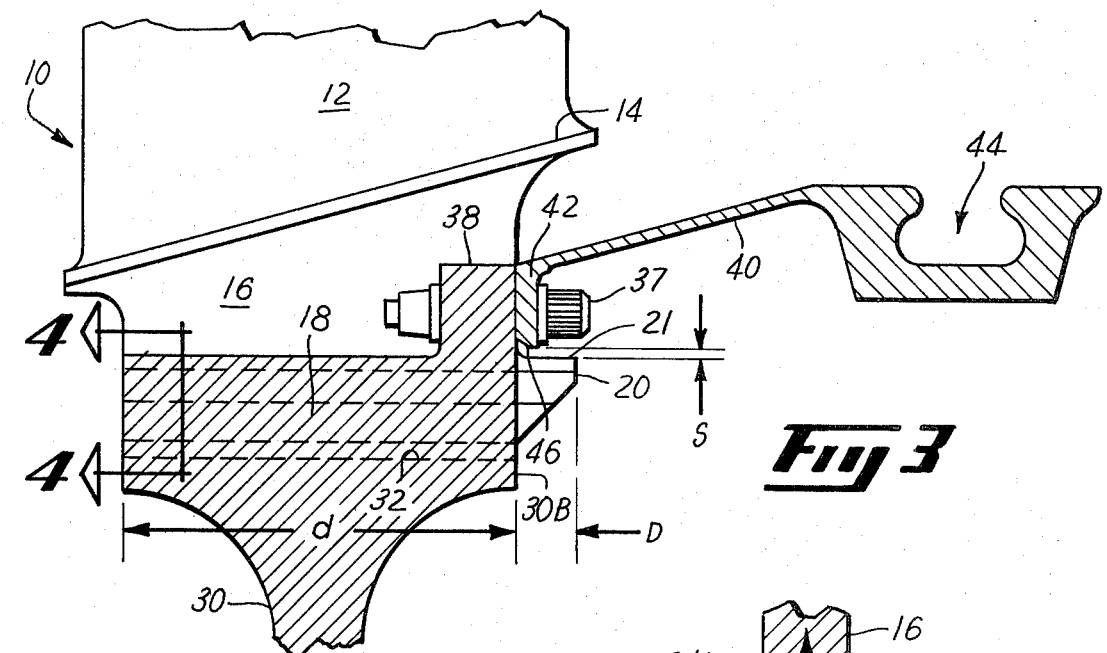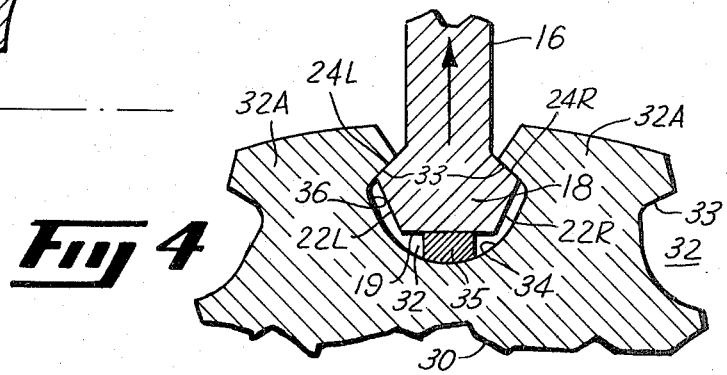

BLADING SYSTEM FOR A GAS TURBINE ENGINE

BACKGROUND OF THE INVENTION

The present invention relates to a blade for a gas turbine engine, and more particularly, to such a blade having a dovetail portion which exhibits improved resistance to blade pull-out.

Gas turbine engine blades are generally provided with dovetail portions which matingly engage corresponding dovetail slots in circumferential retaining members. Exemplary blades having such a dovetail portion for mating with such a dovetail slot are described in U.S. Pat. No. 3,734,646, entitled, "Blade Fastening Means," issued May 22, 1973, to Perkins, and U.S. Pat. No. 4,265,595, entitled, "Turbomachinery Blade Retaining Assembly," issued May 5, 1981, to Bucy, et al. One attractive feature of these exemplary blades is that individual ones of such blades may be removed or installed. These Patents are assigned to the assignee of the present application and are hereby incorporated into reference herein.

Such conventional blade and blade fastening systems are satisfactory for many applications. However, under certain conditions, conventional blade dovetail configurations exhibit insufficient resistance to blade pull-out forces. For example, substantial blade pull-out forces are expected in the form of conventional gas turbine engine generally referred to as a turbofan engine. A conventional turbofan engine includes a fan section, a compressor section, a combustor section, a high pressure turbine section, a low pressure turbine section, and an exhaust section. Such turbofan engines typically have relatively large fan blades which are exposed to damage which may be caused by foreign objects such as birds and the like. For example, if a bird strike situation is of sufficient severity, one or more of the fan blades, or portion(s) thereof, may be released from mating engagement with its retaining dovetail slot in the fan disk. Such a situation may result in a failure mode in which the blade trailing the released blade may be pulled out of its dovetail slot by its interaction with the released blade. In this connection, the moments and loading resulting from the impact interaction, combined with the operational centrifugal loading of the trailing blade, can be sufficient to shear out the trailing blade dovetail, thereby causing further damage to the trailing blade as well as likely further damage to other fan blades and associated engine hardware, such as bearings, seals, and structural frames.

In view of the foregoing, it is desirable to improve the dovetail resistance to such blade pull-outs. One simple solution to this problem is to provide a deeper and larger blade dovetail configuration. However, this simple solution thereby requires a deeper dovetail slot and heavier fan disk member. Such additional bulk, although desirable for strength purposes, is undesirable for cost and fuel efficiency purposes. Indeed, the use of bulkier blade dovetail and disk members additionally requires a heavier disk and bearing structure to accommodate the larger loadings which are associated with the deeper blade dovetails. Furthermore, this simple solution requires dovetail disk configurations in existing engines to undergo substantial modification to provide the improved pull-out resistance. Thus, it would be desirable to provide a simple means for improving the blade dovetail pull-out resistance.

Accordingly, it is a general object of the present invention to provide a gas turbine engine blade having a dovetail portion which exhibits improved strength.

It is another object of the present invention to provide such a blade having a dovetail portion which exhibits improved resistance to blade pull-out forces.

It is another object of the present invention to provide such a blade which does not require a deeper dovetail to provide such improved resistance.

It is another object of the present invention to provide such a blade which can be used to simply replace or repair existing blades having insufficient resistance to blade pull-out forces.

It is another object of the present invention to provide such a blade which is compatible with single blade removal/installation.

It is another object of the present invention to provide such a blade which is relatively simple to manufacture.

SUMMARY OF THE INVENTION

In one form of my invention, I provide a blade for use in a gas turbine engine. The blade is of the type having an airfoil portion, a shank portion and a generally axial dovetail portion of a predetermined axial dimension for matingly engaging a generally axial dovetail receiving slot of substantially the same predetermined axial dimension in a circumferential retaining member. Cleat means is provided and is physically coupled to the dovetail portion. The cleat means projects generally axially from the dovetail portion for strengthening the dovetail portion.

BRIEF DESCRIPTION OF THE DRAWINGS

For a better understanding of the invention, reference may be had to the following description, taken in conjunction with the accompanying drawings, wherein:

FIG. 1 is a side elevational view showing a portion of one form of blade of the present invention.

FIG. 2 is an aft or rear elevational view showing the trailing edge and aft face of the blade of FIG. 1.

FIG. 3 is a side elevational view, taken as in FIG. 1, showing the blade of FIG. 1 in combination with other components of a gas turbine engine.

FIG. 4 is a partially broken away sectional view, taken along line 4—4 of FIG. 3.

DETAILED DESCRIPTION OF THE INVENTION

Figure 5:
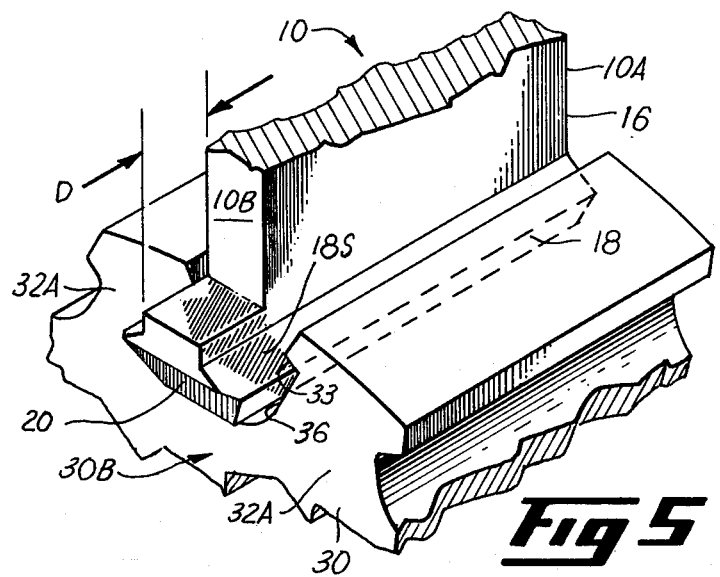
FIG. 5 is a simplified isometric view showing a portion of the blade of FIG. 1 in combination with a portion of a fan disk.

Referring initially to FIGS. 1 and 2, one form of gas turbine engine blade of the present invention is generally designated 10. The blade 10 includes a leading edge and forward face, generally designated 10A, and a trailing edge and aft face, generally designated 10B, which interact with an airflow (see arrow in FIG. 1). The blade 10 includes an airfoil portion 12, a platform portion 14, and a shank portion 16. The shank portion 16 transitions into a dovetail portion 18 having an axial dimension d. As shown more clearly in FIG. 2, dovetail portion 18 includes bottom surface 19 with lateral surfaces 22L and 22R, i.e., left and right surfaces 22, projecting upwardly therefrom at a predetermined typical obtuse angle toward the airfoil portion 12. Lateral surfaces 24L and 24R, often referred to as dovetail pressure faces, extend from the lateral surfaces 22L and 22R at a predetermined typical acute angle with respect to bottom surface 19. The lateral surfaces 24L and 24R smoothly couple into the shank portion 16 through transition surfaces 26L and 26R.

The description above is typical of conventional blade dovetail configurations. However, in one form of the present invention, aft cleat 20 of axial dimension D is provided. More particularly, aft cleat 20 is integral with dovetail portion 18 and axially projects therefrom in the aft direction. For convenience, if desired, the aft cleat 20 may also be integral with the shank portion 16. As will be understood more fully later, aft cleat 20 strengthens the dovetail portion 18 and provides resistance to pull-out of the blade 10 from the dovetail receiving slot (not shown in FIGS. 1 and 2).

Referring now to FIGS. 3 and 4, the blade 10 of FIG. 1 is shown as a fan blade in combination with portions of other components of a gas turbine engine. More particularly, a circumferential retaining member in the form of fan disk 30 (partially shown) is provided and includes a plurality of generally axial dovetail receiving slots 32 for receiving the dovetail portion 18 of the blade 10. The term generally axial, as employed herein, means that the blade dovetail portion 18 and the fan disk dovetail receiving slots 32 are axially aligned with the engine axis or within about ±45° thereto, preferably within ±20° thereto.

As shown more clearly in FIG. 4, the fan disk generally axial dovetail receiving slots 32 are provided to matingly engage the dovetail portion 18. Typically, as shown in FIGS. 1 and 3, in conventional dovetail engagements, the axial dovetail receiving slots 32 are of the same axial dimension d as the conventional blade dovetail portion 18. However, as discussed previously, in one form of the blade 10 of the present invention, aft cleat 20 projects axially in the aft direction a dimension D beyond the dovetail slot 32. Referring to the sectional view of FIG. 4 in combination with FIG. 2, it can be seen that the dovetail slots 32 form dovetail posts 32A integral with fan disk 30. The dovetail posts 32A provide load-bearing surfaces 33 for providing restraining forces to blade pull-out forces (see arrow in FIG. 4) exerted by dovetail lateral pressure surfaces 24L and 24R. Disk receiving slot surface 34 is spaced from bottom dovetail surface 19 by spacer element 35 for ensuring proper operational position of the blade 10, particularly at relatively low rotational speeds. Fan disk 30 also includes load-bearing surfaces 36 for operationally engaging dovetail lateral surfaces 22L and 22R in spaced relation therewith. It is to be recognized that the force distribution discussed above in connection with FIG. 4 is fairly typical of conventional dovetail structures.

As discussed previously, one form of the blade 10 of the present invention includes an aft cleat 20 which strengthens the dovetail portion 18. In order to appreciate the manner in which the aft cleat 20 strengthens the dovetail portion 18, it is helpful to refer to FIG. 5 in which the aft cleat 20 is shown extending beyond the aft surface 30B of the disk 30.

Addition of the aft cleat 20 increases the load-carrying capability of the dovetail material contained in the dovetail portion 18. In this connection, the aft cleat 20 provides additional material aft of that part of the dovetail portion 18 which interfaces with the disk load-bearing surfaces 33. Indeed, by adding the aft cleat 20, the stress-strain state, which would otherwise appear at the aft face 18S (shown in phantom) of the dovetail portion 18, is changed from a state of plane stress, which would allow strain axially in the aft direction from Poisson's effect, to a state approaching plane strain where the axial strain is restrained thus causing an axial compressive stress to develop. This change from plane stress to plane strain is desirable because it increases the load-carrying capability of the dovetail portion 18.

In addition to increasing the load-carrying capability of the dovetail portion 18 which engages the disk load-bearing surfaces 33, the aft cleat 20 may be advantageously employed to increase the dovetail pull-out resistance further through an additional redundant load path. In this connection, referring again to FIG. 3, the blade 10 is shown in combination with a typical fan booster spool element 40. Fan booster spool 40 includes a circumferential forward flange portion 42 which is securably coupled to an aft surface 30B of the fan disk 30. For example, bolt means 37 may be employed to effect such coupling between fan booster spool forward flange 42 and dovetail post lug 38. The fan booster spool 40 itself may include a plurality of dovetail receiving slots 44 for matingly engaging dovetail portions of the fan booster blades (not shown). Referring further to the forward flange 42 of the fan booster spool 40, the coupling of this flange 42 to the disk post lug 38 functions to provide circumferential support to resist spreading of the disk load-bearing surfaces 33, not shown in FIG. 3. The fan booster spool forward flange 42 also includes a circumferential flange surface 46, e.g., an inner surface, which is adapted to receive axially extending load-bearing surface 21 of the aft cleat 20.

Contact between the flange receiving surface 46 and the cleat load-bearing surface 21 is generally unimportant during the normal operating of the fan blade 10. However, to decouple operating radial loads from blade-out forces and to preclude wear and fretting of the booster spool forward flange 42, it is preferable to provide an operating clearance S between the cleat load-bearing surface 21 and the flange surface 46. The clearance S is typically such that contact is not made during normal engine operation, with such clearance S being eliminated during blade-out impact loading. This elimination of the operating clearance S is accomplished during such blade-out impact loading condition as the retaining hardware, i.e., disk load-bearing surfaces 33 and dovetail lateral surfaces 22 and 24 deform elastically and/or plastically to resist the impact loading. It should also be recognized that if the clearance S is made relatively large, during such blade-out impact loading, the flange 42 of the fan booster spool is likely to be impacted with a substantial initial load force, whereas, with a relatively small operating clearance S, the forces impacting the forward flange 42 will gradually develop to a maximum. Accordingly, the provision of relatively small operating clearance S, e.g., typically from about 0.006" to about 0.060", permits the use of a relatively less bulky retaining flange 42 and booster spool 40. Of course, the additional redundant load path provided by the presence of the forward flange 42 of the fan booster spool 40 may be provided by other structure in a gas turbine engine. For example, any available structure, such as flanges, rings, or protrusions from the dovetail post 32A, can be employed to provide the redundant load path.

Figure 8:
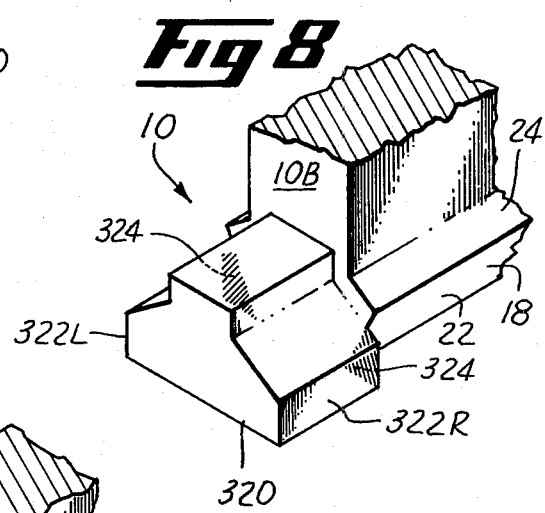

Although the blade of the present invention has been discussed hereinbefore as having aft cleat 20 including a portion with substantially the same cross section as the dovetail portion 18, variations are available. Several variations are shown in FIGS. 6–8, where like reference numerals have been employed to represent like elements.

Figure 6:
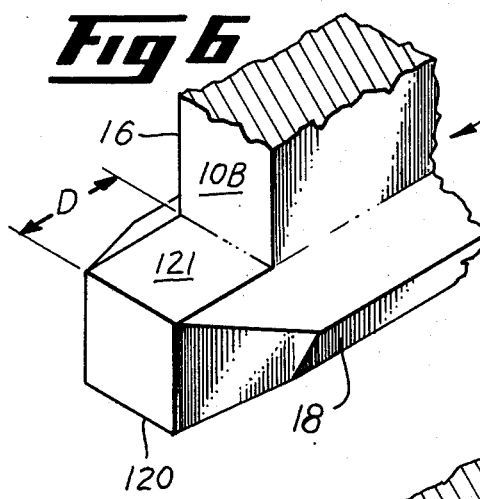
FIGS. 6–8 are isometric views, taken as in FIG. 5, showing a portion of other forms of the blade of the present invention.
Figure 7:
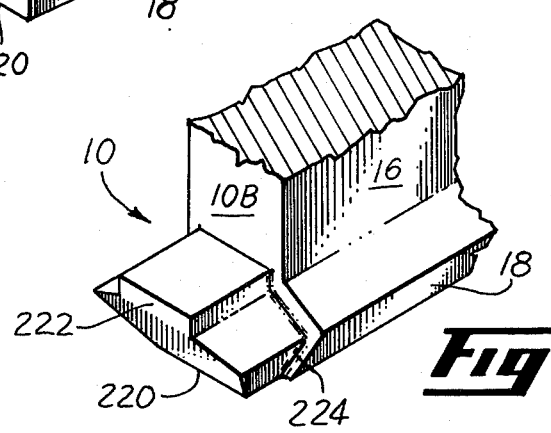

For example, one such variation is shown in FIG. 6 where an aft cleat 120 in the form of a sculptured cleat projects in tapered manner axially a distance D from the aft face 10B of a blade 10. The presence of the aft cleat 120 functions to provide additional material to the dovetail portion 18 which functions to aid in the transformation of the stress-strain state from a state of plane stress to a state of plane strain, although to a lesser degree than the configuration of FIGS. 1–5. In addition, the cleat 120 of FIG. 6 also includes an axially extending load-bearing surface 121 which can be used as discussed in connection with various applications, including the structures of FIG. 3. Other available aft cleat configurations of the present invention include the cleat 220 of FIG. 7 which includes pad portion 222 coupled to shank portion 16 for providing the previously discussed operating clearance S as shown in FIG. 3. If desired, particularly for manufacturing simplicity, step transition 224 may be provided between the dovetail portion 18 and the aft cleat 220. The step 224 is relatively shallow, e.g., about 0.000" to about 0.040", with an appropriate machining fillet so as to strengthen the dovetail portion 18 as previously described. The aft cleat configuration 320 of FIG. 8 includes lateral surfaces 322L and 322R which extend beyond the corresponding dovetail portion 18 surfaces 22 and 24. This structure thereby additionally provides forward stop surfaces 324 for enhancing axial blade retention.

Thus, the aft cleat of the present invention improves the strength of conventional blade dovetail portions by causing the plane stress state to approach a plane strain state at the aft face of the dovetail portion. In addition, the aft cleat of the present invention strengthens the conventional dovetail portion by providing additional material which becomes involved in the resistance to pull-out loading forces at the dovetail pressure faces. More particularly, through shear flow, the adjacent cleat material acts in combination with the aft end of the conventional dovetail portion, thereby providing additional shear and bending resistance to pull-out forces.

Further, the aft cleat of the present invention provides an additional redundant load path during blade-out impact loading for providing improvement dovetail retention. As a result of the improved dovetail retention, blade loss unbalances are reduced. This reduction of blade loss unbalances permits the reduction of engine weight as a result of smaller unbalanced loads and lighter structure/bearing requirements. Similarly, the aft cleat of the present invention reduces engine weight by reducing the amount of containment structure required to capture the resulting smaller blade loss. Further, the blade-dovetail configuration of the present invention provides a simple, interchangeable modification to existing blade designs where the problem of blade pull-out exists. Also, in most embodiments of the present invention, single blade removal/installation is still available. In addition, the blade configurations of the present invention can be simply manufactured.

It is to be recognized that the blade of the present invention provides a more efficient dovetail by precluding the need for a deeper dovetail to achieve substantially equivalent dovetail pull-out resistance. As a result, the blade of the present invention obviates the need for a heavier fan disk, bearing, and support structure to accommodate the larger rim loading which is expected with such deeper dovetails.

Although it is preferable that the aft cleat of the present invention be fabricated integral with the dovetail portion, the aft cleat may simply be physically coupled thereto through available joining techniques, including, for example, welding, brazing, and bonding. Indeed, the use of such available joining techniques permits the strengthening or repair of existing blades simply by joining an appropriate aft cleat configuration to the dovetail portion thereof.

The blade material, particularly the dovetail portion and the coupled aft cleat, is preferably comprised of isotropic materials, such as most metals. One preferred isotropic material is titanium. For some applications, anisotropic materials may be employed if suitably modified in accordance with well-known techniques.

Although the blade of the present invention has been illustrated as including a platform portion for providing desirable flow paths, those skilled in the art will recognize that the blade of the present invention does not require the presence of such a platform.

Although the blade of the present invention has been described in connection with a fan blade for use in a gas turbine engine, it should be recognized that the blade of the present invention is suitable for use in a gas turbine engine in any application where blade pull-out forces are relatively high. For example, the blades are suitable for use in a turbojet-type gas turbine engine, e.g., turboshaft engine, wherein the first stage of rotating blades comprises first-stage compressor blades. Similarly, the invention is applicable in blade configurations for a lift fan, such as, for example, those employed in engines for short takeoff/landing aircraft.

The dovetail cleat of the present invention is not limited to application at the aft face of the blade dovetail. Indeed, the dovetail cleat of the present invention is suitable for strengthening the forward portion of a blade dovetail portion for those applications where substantial blade pull-out forces are expected at the forward face of the blade dovetail portion. For such applications, the cleat may be physically coupled to the forward face of the dovetail portion and extend axially therefrom in the forward direction. In this connection, such a forward cleat of the present invention may, if desired, be employed in combination with the axial retention system described in U.S. Pat. No. 4,265,595, previously incorporated by reference. In one such combination, the forward cleat is disposed between the forward portion of the radially loaded dovetail and the radial slots in the dovetail extension.

While the present invention has been described with reference to specific embodiments thereof, it will be obvious to those skilled in the art that various changes and modifications may be made without departing from the invention in its broader aspects. It is contemplated in the appended claims to cover all variations and modifications of the invention which come within the true spirit and scope of my invention.

What is claimed as new and desired to be secured by Letters Patent of the United States is:

1. In a gas turbine engine including a circumferential blade retaining member having a plurality of generally axial dovetail receving slots of a predetermined axial length therein for matingly engaging blades of the type having an airfoil portion, a shank portion and a generally axial dovetail portion, said dovetail portion having opposing forward and aft faces and a length between said opposing faces substantially equal to the predetermined axial length of said dovetail engaging slots, wherein the improvement comprises in combination:
- (a) cleat means physically coupled with one of said faces of said dovetail and projecting axially therefrom, said cleat means including an axially extending load-bearing surface, and
- (b) means for providing a redundant load path securably coupled to said circumferential blade retaining member, said redundant load path means including a receiving surface positioned to receive said axially extending load-bearing surface of said cleat means with said load-bearing surface being separated from said receiving surface by a predetermined operating clearance, said operating clearance being selected to prevent contact between said receiving and said axially extending load-bearing surfaces during normal engine operation, but permit contact between said surfaces during blade-out impact loading.

2. The improvement of claim 1 wherein said operating clearance is in the range of from about 0.006 inches to about 0.060 inches.

3. The improvement of claim 1 wherein said cleat means project generally axially in the aft direction from said aft face of said dovetail and said redundant load path means are securably coupled to an aft face of said circumferential blade retaining member.

4. The improvement of claim 3 wherein said circumferential retaining member is in the form of a fan disk and said redundant load path means comprise a fan booster spool including a circumferential forward flange portion provided with means for permitting said load path means to be securably coupled to said aft surface of said fan disk, said circumferential forward flange portion further including a circumferential flange surface adapted to receive the axially extending load-bearing surface of said cleat means.

5. The improvement of claim 1 wherein said cleat means has substantially the same cross-sectional shape as said dovetail portion.

6. The improvement of claim 1 wherein said cleat means has lateral surfaces which extend beyond the corresponding surfaces of said dovetail portion forming thereby as part of the cleat forward stop faces for contacting a face of said circumferential blade retaining member.

7. The improvement of claim 1 wherein said cleat means has a smaller cross-sectional shape than said dovetail portion and project axially from said dovetail portion through a shallow step transition, said step transition including a fillet at the junction between said cleat means and said dovetail portion.

8. The improvement of claim 1 wherein said cleat means is integral with said dovetail portion.

* * * * *